Patented Oct. 1, 1940

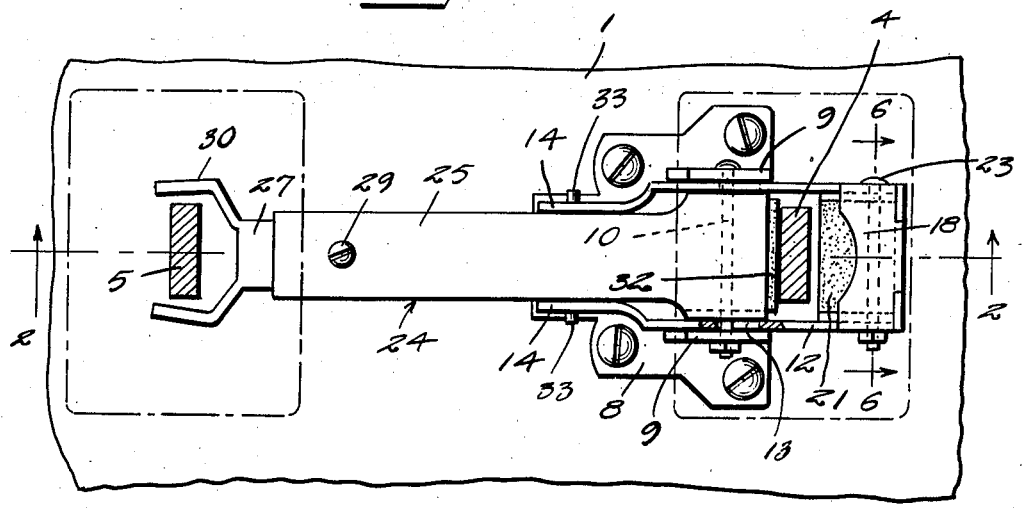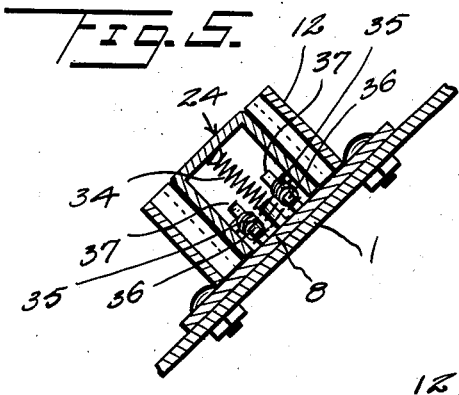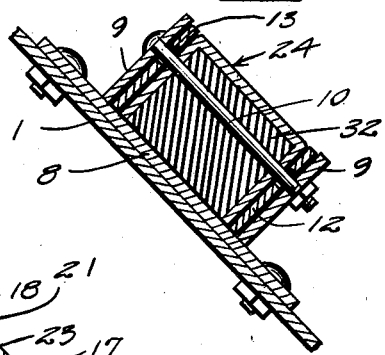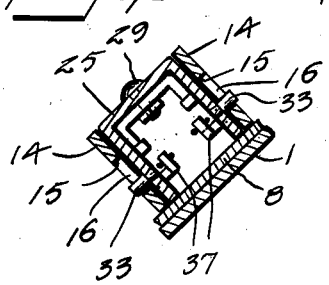

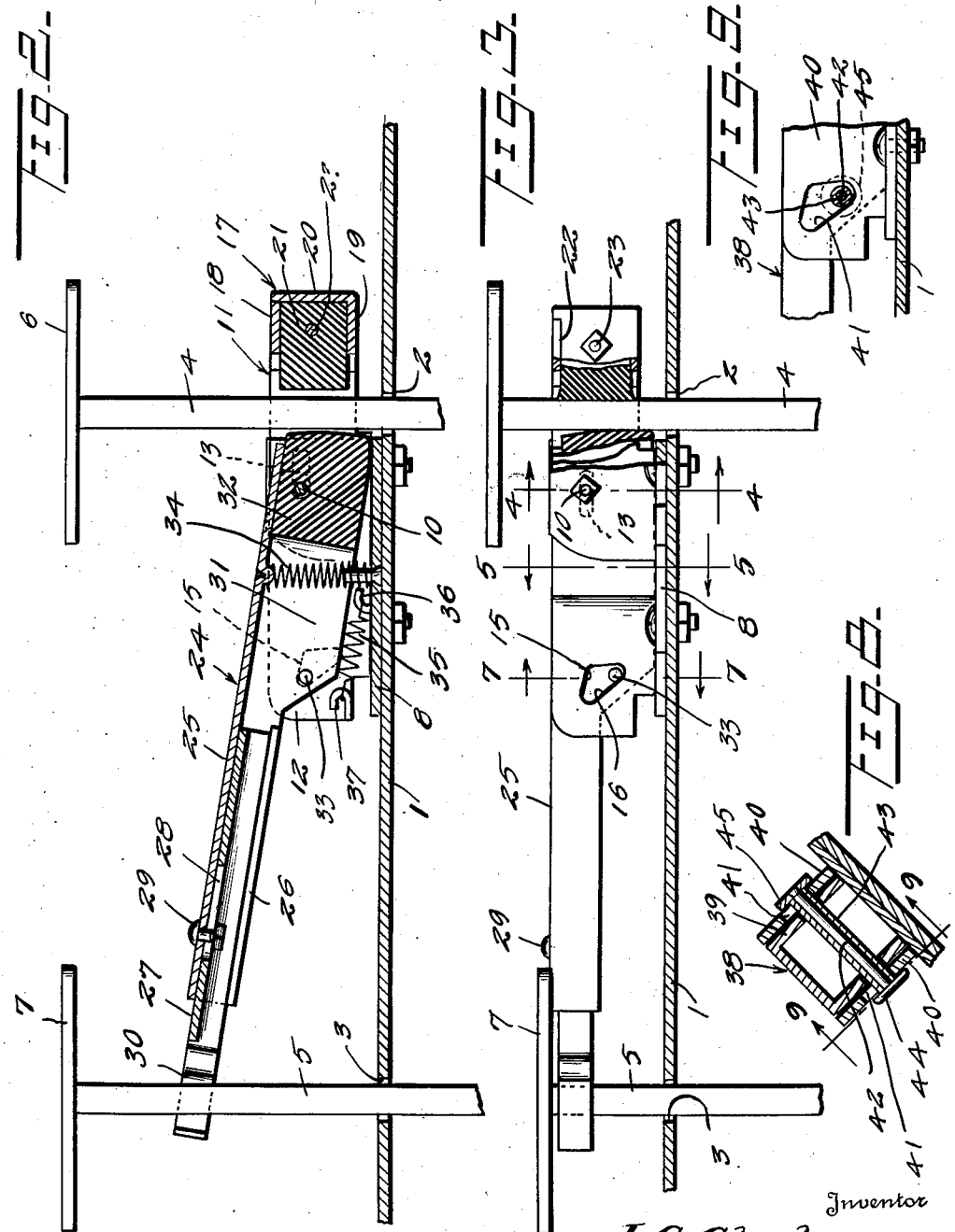

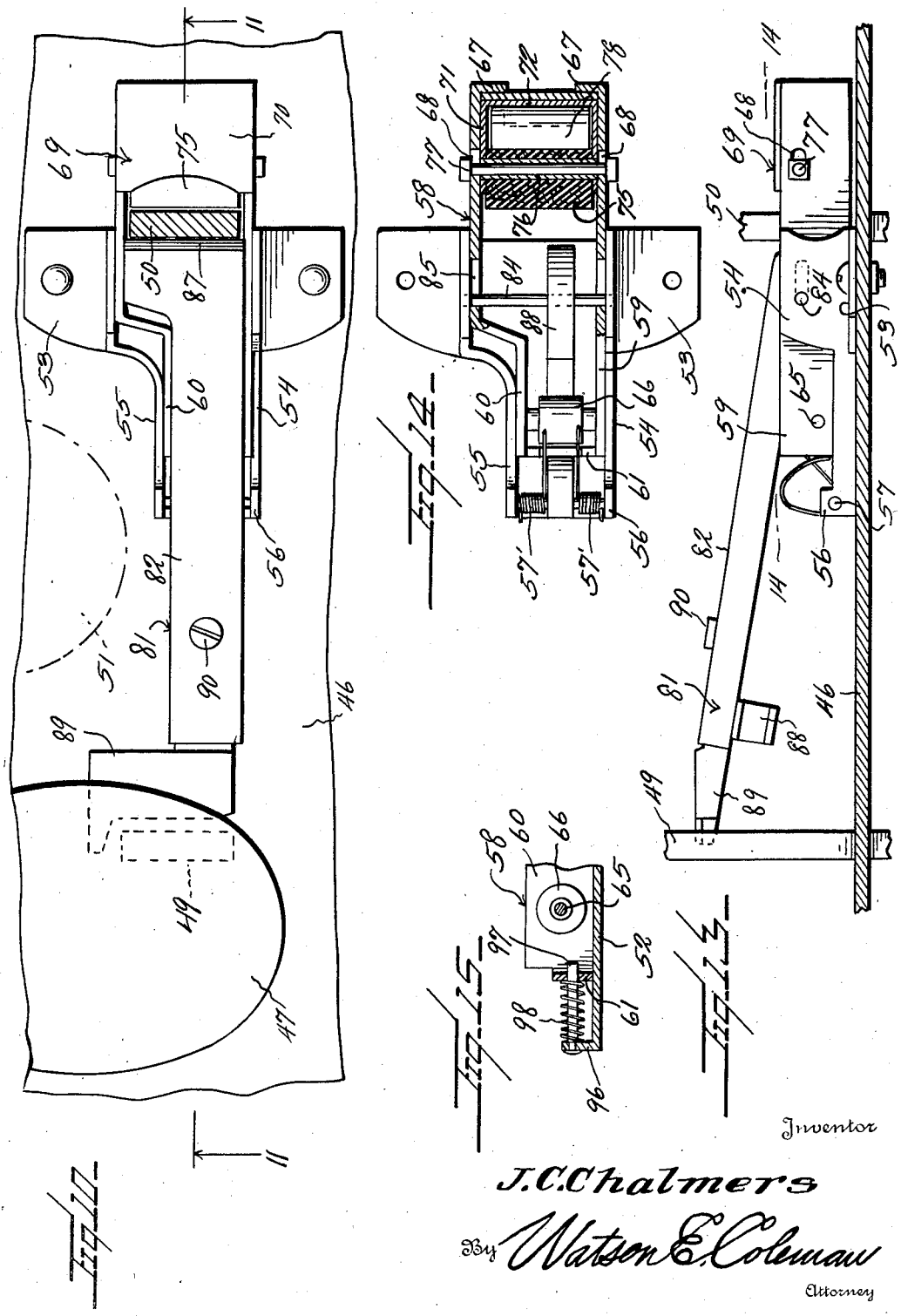

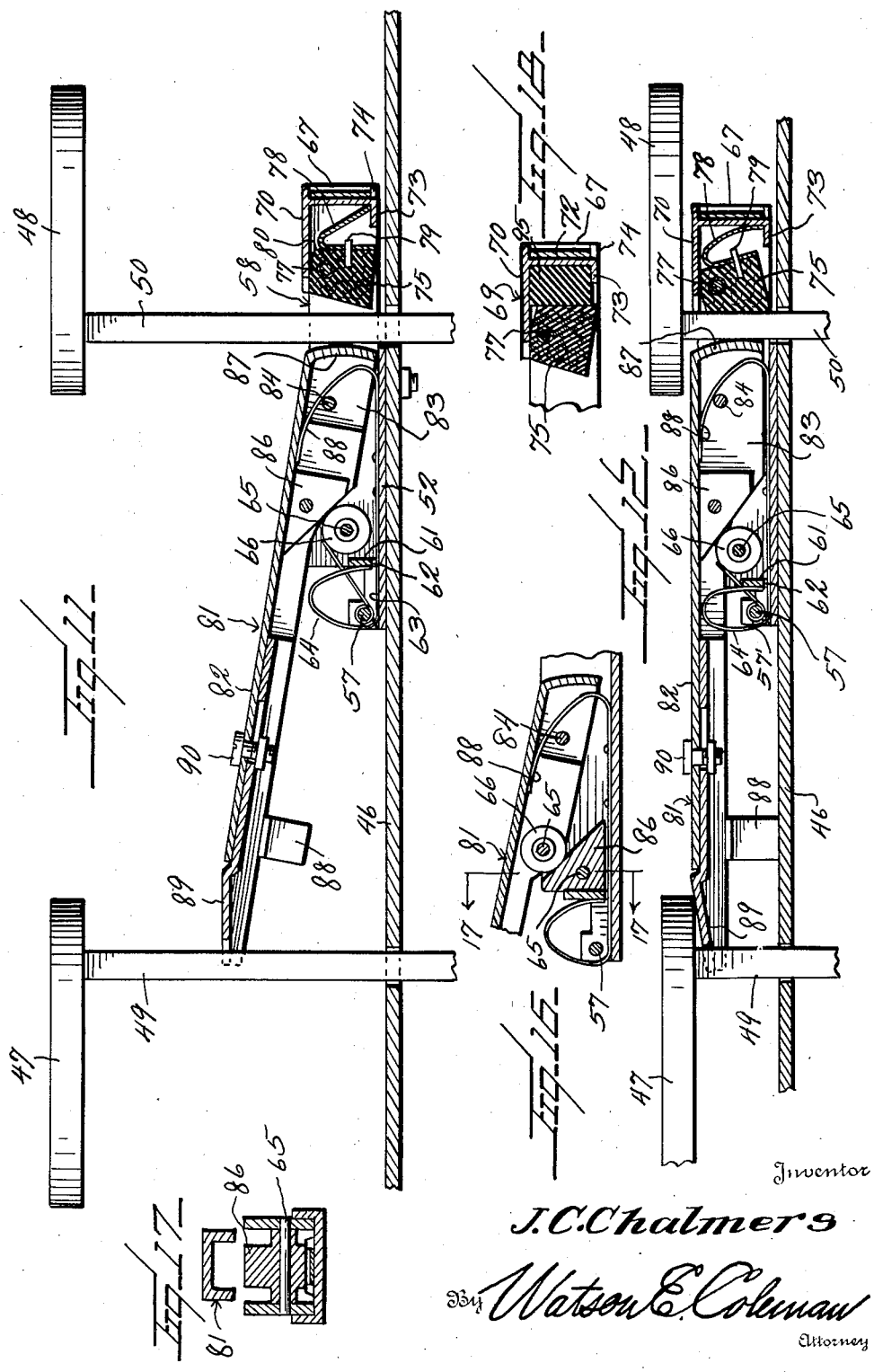

2,216,640

UNITED STATES PATENT OFFICE 2,216,640

CLUTCH ACTUATED BRAKE CONTROL MEANS

James C. Chalmers, Toronto, Ontario, Canada

Application April 27, 1939, Serial No. 270,416

16 Claims. (Cl. 192—13)

This invention relates to an attachment for a motor vehicle and pertains particularly to a device for facilitating the simultaneous control of the vehicle clutch pedal and foot brake.

In the operation of motor vehicles, it frequently occurs that the vehicle is stopped upon a grade and when it is necessary to start up, difficulty is frequently experienced in getting the car under way due to the fact that it is necessary to release the foot brake and transfer the foot to the accelerator pedal in order to accelerate the engine to the proper speed necessary before letting in the clutch, and during this interval when the foot is being transferred from the foot brake pedal to the accelerator pedal, the car will drift on the grade, sometimes with serious consequences where the driver is unable to properly shift the gears, accelerate the engine and engage his clutch with the necessary speed.

It is known that there have been devices employed heretofore which are brought into operation simultaneously with the disengagement of the vehicle clutch to apply the vehicle foot brake, but some devices have been found to be unsatisfactory and in addition require the exercise of substantially as much skill in operation as is required in the starting of the vehicle when the same is on a grade without the use of such control devices between the foot pedals.

The present invention has for its primary object to provide a device which is designed to be applied to the footboard of a motor vehicle adjacent to and between the foot brake and clutch pedals, by means of which, when the clutch pedal is fully depressed for the complete disengagement or release of the clutch, the foot brake may be held in applied position, thus making it possible to maintain the foot brake applied without having to keep the right foot upon the foot brake pedal while the vehicle is standing still so that the right foot normally employed for actuating the foot brake may be in position for accelerating the engine when it is desired to start up the vehicle, this use of the device being of particular value or importance where the vehicle may be stopped while on an up-grade or in the event that the engine is stalled, as it leaves the foot free for actuation of the starter button and for immediate transferral to the accelerator pedal and does away with the objectionable use of the emergency brake which, even with experienced vehicle drivers, is frequently found difficult to release at the proper moment.

Another object of the invention is to provide a device of the above described character which is so designed that it will not interfere in any way with the independent operation of the foot and clutch brake pedals.

A further object of the invention is to provide a device of the above described character which is designed to grip the foot brake pedal actuating lever when the clutch pedal has been fully depressed so as to hold such lever either when the brake is applied or when it is not applied, and to immediately release such lever when the clutch is allowed to return to engaged position so that the operator of the vehicle will be helped in starting his car when the same is on a grade, to the extent that he can keep his foot upon the accelerator pedal and accelerate the engine as necessary for starting while allowing the clutch to engage without having to worry about the release of the brake, such release occurring automatically with the engagement of the clutch.

Other advantages of the invention will become apparent as the description of the same proceeds and the invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings—

Fig. 1 is a view in top plan of the device embodying the present invention, showing the same mounted between the levers of the brake and clutch control pedals of a vehicle, such levers being in cross-section.

Fig. 2 is a sectional view upon the line 2—2 of Fig. 1, showing the device in inoperative position with the vehicle foot pedals raised.

Fig. 3 is a view partly in side elevation and partly in section of the device in operative position wherein the foot pedals are depressed and the device is securing the same against independent movement.

Fig. 4 is a sectional view taken on the line 4—4 of Fig. 3.

Fig. 5 is a sectional view on the line 5—5 of Fig. 3.

Fig. 6 is a sectional view on the line 6—6 of Fig. 1.

Fig. 7 is a sectional view on the line 7—7 of Fig. 3.

Fig. 8 is a transverse sectional view of a modified form of connecting means between the sliding and oscillating members.

Fig. 9 is a sectional view on the line 9—9 of Fig. 8.

Fig. 10 is a view in top plan of a slightly modified form of the invention as illustrated in Fig. 1.

Fig. 11 is a sectional view on the line 11—11 of Fig. 10.

Fig. 12 is a sectional view similar to Fig. 11 but showing the device parts in working position.

Fig. 13 is a view in side elevation of the modified form of the device as shown in Fig. 10.

Fig. 14 is a sectional view taken substantially upon the line 14—14 of Fig. 13.

Fig. 15 illustrates a modification of the spring actuating means for the slide member of the device.

Fig. 16 illustrates a modification of the camming units shown in Figs. 11 and 12.

Fig. 17 is a sectional view taken on the line 17—17 of Fig. 16.

Fig. 18 is a sectional view showing a modification of the friction block presser or oscillating means.

Referring now more particularly to the drawings, the numeral 1 generally designates the floorboard of a motor vehicle having the usual openings 2 and 3 therethrough, through which extend the levers 4 and 5 for the foot brake and clutch pedals, respectively, which pedals are indicated by the numerals 6 and 7. The device embodying the present invention is designed to be mounted upon the floorboard 1 between the levers 4 and 5, as shown in Figs. 2 and 3, and this device comprises a base plate 8 formed of suitable metal such, for example, as aluminum alloy or any other metal which is sufficiently strong and which is rust-proof so that the device may present a nice appearance. This base plate 8 carries the upstanding spaced parallel ears 9 between which extends a connecting shaft or pin 10 upon which the hereinafter described pivoted and reciprocating members are mounted.

The numeral 11 generally indicates a reciprocating or slide member which is disposed for operation between the ears 9 and this member comprises the two elongated side plates 12, each of which is provided with a short longitudinally extending slot 13, through which the pin 10 passes so that the plates 12 have limited sliding movement on the base 8. The lower edges of the plates 12 rest upon the base 8, as shown in Fig. 2, and each of these side plates extend to one side beyond the base plate and across the opening 2 through which the foot brake lever passes.

The plates 12 are disposed against the inner sides of the ears 9 and each has the end remote from the foot brake lever 4 inset slightly, as indicated at 14, in Fig. 1, and provided with the substantially triangular recess or slot 15, one edge of which is disposed at an angle to the underlying floor to provide a camming surface 16, for the purpose hereinafter described. This camming edge extends obliquely with respect to the plate in which the opening is formed and when the device is in operative position, it extends upwardly and away from the foot brake lever 4.

The ends of the plates 12 remote from the inset ends 14 have disposed therebetween a frame-like unit 17 which constitutes of a top 18, bottom 19 and outer side 20. The ends and inner side of this unit are open and secured between the top and bottom sides is a friction block of rubber or rubber composition material 21, which extends beyond the edges of the top and bottom sides of the frame, as shown in Fig. 2, so that it may have firm contact with the adjacent side of the foot brake lever 4 when the device is operated.

The top edge of each plate 12 is notched, as indicated at 22, in Fig. 3, to receive the adjacent end of the top plate or wall 18 of the rubber body holding frame. By this means a locking connection is established between the frame 17 and the plates 12 which prevents the frame from slipping from between the ends of the plates and the plates are further held against separatory movement by a bolt 23 which passes through them and transversely through the friction block 21.

Upon the opposite side of the foot brake lever 4 from the block 21, there is disposed a lever arm, which is indicated generally by the numeral 24. This arm consists of an elongated main body portion 25 which has longitudinal side flanges 26, and a short end extension 27 which is slidably disposed against the underside of the body 25 between the flanges and is provided with a longitudinal slot 28 to receive a securing screw 29 which holds the parts 25 and 27 in longitudinally adjusted relation. The outer end of the longitudinally movable portion 27 of the lever arm is forked, as indicated at 30, and is designed to receive the clutch pedal lever 5, as shown in Fig. 1.

The end of the arm 24 remote from the fork 30 is disposed between the plates 12 of the slide 11 and the flanges 26 are widened throughout a portion of their lengths from the inner end of the arm, as indicated at 31, to be of substantially the same height as the plates 12. Between the widened portions 31 of the arm flanges and at the inner end of the arm, is fixed a friction block 32 through which the pivot bolt or pin 10 passes, this pin also, of course, passing through the adjacent flange portions 31. Thus the friction block 32 oscillates with the arm 24 while the opposite block 21 reciprocates with respect to the arm and to the lever 4 which is interposed between the two blocks.

The enlarged portions of the flanges 31 adjacent the ends remote from the block 32 carry outwardly projecting cam pins 33, each of which engages the edge 16 of the adjacent opening 15 into which it extends. The camming pin and camming surface at each side of the arm are arranged so that when the arm 24 is in the raised position shown in Fig. 2, each pin 33 will be in the upper part of its opening 15 and at the upper end of the cam edge 16 thereof, and when the arm 24 is depressed, the pins 33 will bear against the camming edges 16 so as to move to the lower ends of the openings and simultaneously pull the slide 11 so as to move the block 21 into engagement with the lever 4. Supported upon the base plate 8 at the inner side of the oscillating block 32 is the vertically disposed helical spring 34 which bears at its upper end against the underside of the part 25 of the arm and normally urges the forked end to swing upwardly.

The slide 11 is constantly urged to move away from the pivoted end of the arm by the pair of springs 35, each of which is attached at one end to an upstruck ear or hook 36 formed from the base plate 8 and has its other end attached to a hook 37 which is formed upon the inner side of the adjacent end of the adjacent slide plate 12.

In setting up the present device for use, the base plate 8 is set between the levers 4 and 5 and in such a position that the contact side or face of the oscillatable friction block 32 will be in close proximity to the inner side of the foot brake control lever 4. This will leave the proper clearance between this lever and the inner or working face of the slidable block 21 so that when the arm 24 is in raised position, the lever 4 can be freely moved.

The forked end of the arm is set so that there will be a sufficient clearance between it and the pedal 7 by which the clutch is operated, which will permit the clutch to be disengaged without bringing the pedal into contact with the fork and thus effecting the depression of the arm 24. This will permit the usual manipulation of the clutch pedal for the purpose of shifting gears, without causing the device to engage the brake lever so that the brake may be freely operated as may be necessary during such clutch shifting operations.

When the vehicle in which the present device is mounted is stopped, the device may be made use of for holding the foot brake applied so that the brake controlling foot of the operator may be held upon the accelerator pedal for a quick get-away. As is well known, when a motor vehicle is brought to a stop, the brake pedal is depressed in advance of the clutch pedal and thus it will be seen that when the vehicle has been brought to a full stop, the brake pedal will be fully depressed and by then fully or completely depressing the clutch pedal, this pedal will engage the fork 30, as shown in Fig. 3, and bring about the necessary oscillation of the arm 24 to swing the oscillating friction block 32 into contact with the adjacent side of the lever 4 and to move the slide 11 so as to draw the other block 21 firmly into contact with the opposite side of the lever. Thus the brake lever will be firmly gripped, as shown in Fig. 3, between the two friction blocks so long as the clutch pedal is held depressed and the operator of the vehicle will not have to keep his foot upon the brake pedal to hold the vehicle if it should happen that the stop has been made upon a grade. In starting up, after stopping the vehicle on a grade, the operator can keep his foot upon the accelerator pedal and accelerate the engine fully as is necessary while letting in the clutch, the brake pedal holding device retaining the brake applied until the engine has been fully accelerated and the clutch is engaged, whereupon the brake will be automatically released and the car can start ahead in the usual way.

In Figs. 8 and 9, a slightly modified form of the camming connection between the oscillating arm and slide is shown. In these views, the arm is generally indicated by the numeral 38 with the side flange portions thereof indicated at 39 and shown as disposed between the side plates 40 of the slide. The cam slots in the plates 40 are indicated by the numeral 41. In this camming arrangement, there is provided a steel pin 42 which passes across the arm through the flanges 39 and through the slots 41, and is enclosed in a sleeve 43 which is designed to turn freely on the pin. This sleeve extends at its ends into the camming slots 41 and the pin and the sleeve are held against longitudinal movement through the slots 41 by the relatively large disk head 44 which is secured upon one end of the pin and the disk plate 45 which is secured at the opposite end of the pin. These disks upon the ends of the pin substantially cover the slots 45, as indicated in dotted lines in Fig. 8, so that the pin and sleeve cannot shift transversely of the device, but the sleeve provides a rolling or anti-friction coupling for effecting reciprocatory movement of the slide.

Referring now to Figs. 10 to 14, inclusive, there is illustrated a modification of the structure shown in Figs. 1 to 3. In the illustration of the application of this modification, the vehicle floorboard is generally indicated by the numeral 46 while the clutch and brake pedals are indicated respectively by the numerals 47 and 48, the levers or arms for which are indicated respectively by the numerals 49 and 50. This improved form of the brake pedal lever holding device is also designed so as to facilitate its use in vehicles where the steering column comes further back between the foot pedals than it does in older model cars, the location of this steering column being indicated at 51 in Fig. 10, this figure illustrating how the device has been formed to accommodate the steering column.

In the form of the device now under consideration, there is provided a base plate 52 which at one end is formed to provide the lateral attaching ears 53 which are secured in a suitable manner to the floorboard 46.

Formed integral with the base plate 52 are the spaced parallel guide flanges 54 and 55, the flange 55 being offset toward the flange 54 through substantially the left hand half of its length, thereby preventing interference of the device with the steering column 51.

At their inner ends, that is, the ends lying between the levers 49 and 50, the flanges 54—55 terminate in the upstanding ears 56 between which is supported a spring carrying pin 57 around which are wound the two coil springs 57' which are particularly disclosed in Fig. 14.

The numeral 58 generally designates a slide member which is made up of the two side arm pieces 59 and 60 which rest upon the base plate 52 and slide between the guide flanges 54 and 55. The flanges 54 and 55 at their outer or right hand ends are, through a portion of their length, of greater height at their inner ends. The height of the outer end portions of these flanges is, as shown in Fig. 13, substantially the same as the height of the arms 59 and 60. The arm 60 is offset intermediate its ends, as shown, to correspond with the offset of the flange 55, otherwise there is no difference between the two arm portions of the slide member. At their inner ends the arms of the slide member are connected by the low cross strip 61, the lower edge of this strip being cut out as shown in Figs. 11 and 12 at 62, to accommodate the flat spring or spring strip 63 which is secured to the top of the base 52 and extends under the pin 57, curving upwardly, outwardly and downwardly, as shown in Fig. 11, to form the loop spring 64, the free end of which bears against the inward side of the cross strip 61. This spring, therefore, constantly urges the slide 58 to move outwardly or toward the left of the pedals so as to normally release the brake pedal lever as will be hereinafter more fully explained.

In the form of the invention shown in Figs. 10 to 12, the arms of the slide 58 have extending therebetween adjacent their inner ends, a pivot pin 65 on which is supported a roller 66 and the coil springs 57' each has one end extended across the connecting piece 61 between the slide arms and resting on the roller 66 so as to assist the flat spring loop 64 in urging the slide outwardly.

At the outer end of the slide 58, the arms terminate in the inturned ears 67 and adjacent these ears the arms are provided with the oppositely disposed longitudinally extending slots 68.

Disposed between the arms 59 and 60 of the slide is a friction block box generally designated 69 and consisting of a top plate 70, the side plates 71 and the back plate 72. The lower side or bottom and the inner side of this box are open. The back plate at its lower edge has a central inwardly turned flange 73 and at each end the outwardly turned tongue 74 which engages in a suitable notch formed in the lower edge of the adjacent slide arm ear 67 when the box 69 is disposed between the slide arms. The top plate 70 of the box extends slightly beyond the side and outer walls 71 and 72 so as to rest upon the top edges of the slide arms and the ears 67 and thus assist in suspending the box between the arms.

Disposed within the box 69 is a block 75 of suitable friction material such as a rubber asbestos composition having steel or copper wire strands interspersed therethrough. This block has a sleeve 76 extending transversely therethrough through which extends a bolt 77 which has its ends mounted in the slots 68 of the arms of the slide.

Interposed between the friction block 75 and the back plate 72 of the box is a spring 78 which has one edge resting upon and supported by the box flange 73 while the opposite side of the spring presses against the block and is held in position by a pin 79 which is secured in the block and extends through a suitable aperture in the adjacent side of the spring. The spring is of substantially U-shaped cross-section and is of a length to extend across the width of the box, as shown in Fig. 14.

As shown in Figs. 11 and 12, the block 75 has its upper outer edge rounded, as at 80, so that it may rock on the pin 77 and the inner face of the block 75 is cut at an incline or is beveled slightly so that when the block is in normal position as shown in Fig. 11, the lower inner edge will be nearer the brake lever 50 than the top inner edge but when the device is actuated for the gripping of the foot brake lever, the block will rock to the position shown in Fig. 12, so that its inclined face will come into firm contact with the adjacent side of the foot lever. With this arrangement it will be readily apparent that even though the foot brake lever may be engaged by the friction block 75, this will not prevent movement of the foot brake lever in a direction to apply the brake although it will prevent reverse movement of the foot brake lever.

The numeral 81 generally designates the slide actuating lever which consists of a channel-shaped arm or bar 82 in which the channel side is directed downwardly and which at one end has the side flanges of increased width, as indicated at 83, and disposed between the sliding arms 59 and 60. Extending transversely of and connecting the flanges 83 of the lever is a pin 84 which extends through the longitudinally extending oppositely positioned guide slots 85 which are formed through the arms of the slide inwardly from the friction block 75 and the ends of this pin 84 are secured in the guide flanges 54—55. The lever 81 thus rocks upon the pin 84 and inwardly of this pin the lever has secured to its underside the camming block 86, the cam face of which engages the roller 66 which is supported between the slide arms, thus when the lever 81 has its inner end depressed, the camming block will bear against the roller 66 and cause the slide 58 to move inwardly so as to bring the friction block into contact with the foot brake lever 50.

The outer end of the lever 81 is formed with the bowed or arcuate gripping jaw 87 which normally lies in close proximity to the inner side of the foot brake lever 50 and forms an abutment for the lever when the friction block is pressed against the opposite side. The lever arm 81 is normally oscillated so that the inner end is raised above the pivoted outer end, by the leaf spring 89 and this action is assisted, of course, by the springs 57' and 64 which urge the slide to move outwardly and thus urge the roller against the inclined face of the camming block 86.

At its inner end the actuating lever 81 carries a foot member 88 which contacts the floorboard 46 when the actuating lever is in the down position shown in Fig. 12. This foot prevents movement of the lever to an extreme position which might cause damage to the device.

The form of the device being described has at the inner end of the actuating lever 81 an extension piece 89 which is attached by the securing screw 90. This attachment or extension piece is provided particularly for use of the device in association with those clutch pedals in which the supporting lever is disposed at one side of the center of the pedal. This extension may also be employed where the distance between the pedals varies in different cars so that the device may be readily adapted to any style of car. Under some circumstances, as for example, in the use of the device in association with a car of the old model having clutch and foot brake pedals supported as shown in Fig. 1, the extension device need not be employed as the inner end of the portion 82 of the lever may be located directly beneath the pedal.

As will be readily apparent from the foregoing description of this modification of the device, the clutch pedal may be actuated for all operations of shifting gears without bringing the pedal into engagement with the lever arm 81 so as to effect the gripping of the brake pedal lever, but when the latter lever is to be secured and held with the brake applied, a full depression of the clutch pedal will oscillate the actuating lever arm 81 to the position shown in Fig. 12. In this figure, it will be seen that when the friction block is drawn inwardly by the movement of the slide member 58, it will be rocked so that its entire friction face will engage the adjacent side of the foot brake lever. If, in the operation of the vehicle, the operator should accidentally simultaneously depress his clutch lever and accelerator under the belief that the clutch lever and foot brake pedal were being depressed and, realizing his mistake, shift the right foot to the foot brake pedal, the fact that the foot brake lever would be gripped between the block 75 and the jaw 87 would not prevent the application of the foot brake because of the nature of the mounting of the friction block 75. The foot brake lever could still be depressed for the application of the foot brakes even though it might be already gripped through the previous depression of the actuating lever 81 by the vehicle operator.

Fig. 15 illustrates a modified means of shifting the slide back to its inoperative position when the actuating lever 81 is released. In this modified construction, the inner end of the bottom or base plate 52 of the device is provided with an upstanding flange 96 and there is secured to this flange a pair of outwardly extending pins 97 which pass through suitable apertures in the transverse portion 61 which connects the slide arms 59 and 60. Surrounding these pins 97 and interposed between the flange 96 and the cross strip 61 are expansion springs 98 which normally urge the slide outwardly. When using this arrangement, the inner ends of the plate 52 and of the slide arms will be extended a greater distance beyond the adjacent roller 66 so that when the slide moves inwardly, the roller will not strike the ends of the fixed pins 97.

It will be readily obvious that the arrangement of the pins 97 may be reversed if desired, so that they will be fixed to the cross-piece 61 and slide through the flange 96.

Fig. 16 illustrates a slight modification of the cam and roller arrangement shown in Figs. 11 and 12. In this arrangement the roller 66 is disposed between the flanges of the actuating lever 81 while the friction block is reversed and is supported upon the pin 65 which in the arrangement shown in Fig. 11, supports the roller. As the ends of the roller 66 are cut away as shown in Fig. 14, so as to accommodate the flanges of the actuating lever 81 when the latter is depressed, so the cam block 86 is cut away at its sides as shown in Fig. 17, so as to receive the flanges of the actuating lever 81 when the latter is in depressed position.

Fig. 18 shows a modified method of resiliently holding the friction block 75 in its normal forwardly oscillated position. In this arrangement there is provided in substitution for the spring 78, a rubber block 95 which is housed between the friction block and the side and outer walls 71 and 72 of the block box, resting upon the flange 73 of the box, as shown in this figure. It will be readily obvious that this rubber block 95 will function in exactly the same manner as the spring 78 when the slide is shifted so as to bring the friction block into contact with the adjacent side of the foot brake lever.

From the foregoing, it will be readily apparent that the devices herein disclosed provide a convenient and safe means of holding the foot brake of a motor vehicle when the vehicle is standing and during the preliminary procedure of starting the vehicle when the same has been brought to a stop upon a grade or after being stalled thereon as previously described. At the same time, the device is of a character which makes it inexpensive to manufacture and which occupies a minimum of space between the vehicle pedals so that it will not be in the way or interfere in any way with the normal operation of the pedals.

Provision is made for accommodating foot brake levers having a thickness greater than the levers shown, by providing a removable plate 96 behind wall 72, which plate when taken out permits block 75 with bolt 77 to be moved away from the lever.

What is claimed is:

1. A brake lever control for use upon a motor vehicle between the vehicle brake operating lever and the clutch pedal lever, comprising a pair of spaced gripping jaw members between which said brake lever is disposed, means supporting one of said jaw members for oscillation, means supporting the other one of the jaw members for reciprocatory movement relative to the first jaw member, an actuating arm for and connected with the oscillating jaw member, means for effecting oscillation of said arm by and upon depression of said clutch lever to a predetermined extent, and an operative coupling between said arm and said reciprocating jaw member whereby oscillation of the arm will effect movement of the reciprocating jaw member in a direction to grip the foot brake lever between the jaws.

2. A foot brake lever control for use upon a motor vehicle between a foot brake lever and a clutch lever pedal, comprising a sliding member mounted for movement in a path perpendicular to the foot brake lever, a gripping jaw carried by said sliding member for engagement with the foot brake lever, an arm pivotally mounted upon the side of the foot brake lever opposite from said jaw, a second jaw carried by said arm and oscillatable therewith and upon the pivoting thereof for engagement with the foot brake lever, said arm being designed to have its other end disposed in the path of movement of the clutch lever pedal whereby movement of said pedal to a predetermined extent will effect oscillation of the arm and engagement of the second jaw with the foot brake pedal, and a cam connection between said arm and said slide by which said slide will be shifted in a direction to move the first jaw into contact with the foot brake lever when the arm is oscillated.

3. A device of the character described adapted to be disposed between a motor vehicle foot brake lever and the lever of a clutch control pedal, comprising a slide member mounted for movement in a path perpendicular to the foot brake lever and including a pair of side plates between which said lever is disposed, a friction block secured between said plates and adapted to be brought into engagement with one side of the brake lever, supporting means for said plates upon the opposite side of the brake lever from said block, an arm rockably supported at one end upon said supporting means, a friction body carried by the arm at the supported end thereof for engagement with the other side of the foot brake lever when the arm is rocked in one direction, said arm being designed to have its other end disposed in the path of movement of the clutch lever pedal, means forming camming surfaces upon said plates, camming members carried by said lever and engaging said camming surfaces and resilient means engaging said plates and normally urging the movement of the same in a direction to shift the friction block away from the brake lever, said camming means operating upon the camming surfaces when the arm is oscillated in one direction by said clutch pedal to shift the plates and friction block in opposition to the action of said resilient means to bring the block into engagement with the brake lever upon the side thereof opposite from the side opposed by the friction body.

4. A device of the character described for operatively coupling a vehicle foot brake lever and a clutch control lever carrying a pedal, comprising a sliding member mounted adjacent the brake lever for movement in a path transversely thereof, a friction block carried by the sliding member for contact with one side of the brake lever, said sliding member including two plates, each of which is provided with a cam slot upon the side of the brake lever remote from the block, a pivot pin supported transversely of the brake lever between the same and said camming slots and slidably supporting the slide plates, an arm supported at one end upon said pin for rocking movement, the other end of the arm being disposed to position beneath the clutch pedal, a gripping body carried by the arm and traversed by said pivot pin and adapted to be moved into contact with the adjacent brake lever when the arm is oscillated in one direction by the clutch pedal, resilient means connected with the slide plates and normally urging the movement of the same in a direction to shift said block away from the brake lever, resilient means normally urging the oscillation of the arm in a direction to remove the friction body from contact with the brake lever, and cam means carried by the arm and engaging in said camming slots and operating upon oscillation of the arm by the clutch pedal to shift the slide in a direction to bring the block into contact with the brake lever simultaneously with the engagement of the brake lever by the gripping body.

5. A device of the character described for operatively coupling a vehicle foot brake lever and a clutch control lever carrying a pedal, comprising a sliding member mounted adjacent the brake lever for movement in a path transversely thereof, a friction block carried by the sliding member for contact with one side of the brake lever, said sliding member including two plates, each of which is provided with a cam slot upon the side of the brake lever remote from the block, a pivot pin supported transversely of the brake lever between the same and said camming slots and slidably supporting the slide plates, an arm supported at one end upon said pin for rocking movement, the other end of the arm being disposed to position beneath the clutch pedal, a gripping body carried by the arm and traversed by said pivot pin and adapted to be moved into contact with the adjacent brake lever when the arm is oscillated in one direction by the clutch pedal, resilient means connected with the slide plates and normally urging the movement of the same in a direction to shift said block away from the brake lever, resilient means normally urging the oscillation of the arm in a direction to remove the gripping body from contact with the brake lever, and cam means carried by the arm and engaging in said camming slots and operating upon oscillation of the arm by the clutch pedal to shift the slide in a direction to bring the block into contact with the brake lever simultaneously with the engagement of the brake body by the gripping body, said arm including a longitudinally extensible forked portion at the end thereof remote from the pivot pin for the reception of the clutch lever.

6. A brake control device for use in a motor vehicle between the clutch and brake pedal levers, comprising a pair of gripping jaws supported with the brake pedal lever between the same, one of said jaws being mounted for rectilinear movement with respect to said lever, the other jaw being mounted for oscillatory movement, means connected with the said other jaw and arranged to be engaged by the clutch pedal when depressed to a predetermined position for effecting oscillation of the said other jaw, means which is so constructed and arranged that upon the oscillation of said other jaw the rectilinearly movable jaw will be shifted into contacting relation with the brake pedal lever, and means supporting said last jaw permitting oscillation of the same when brought into contact with the brake pedal lever whereby said latter lever may be shifted in one direction while being gripped between the jaws.

7. A brake control mechanism for use in a motor vehicle between the clutch and brake pedal levers, comprising a reciprocably mounted jaw member disposed upon one side of the brake pedal lever for movement relative thereto, an oscillatably mounted jaw member upon the opposite side of the brake pedal lever and normally maintaining a position in close proximity thereto, said reciprocable jaw member having a beveled jaw face and being in closer relation to the adjacent lever at its lower edge than at its upper edge, said last jaw member being mounted for oscillation on an axis extending transversely of its line of movement, yieldable means normally urging oscillation of the last jaw member in a direction to project the lower edge of the beveled face into close proximity to the adjacent lever, means connected with said oscillatable jaw for engagement by the clutch pedal when the latter is depressed to a predetermined position for oscillating the oscillatable jaw, and means which is so constructed and arranged that upon actuation of said last means by the clutch pedal, the said reciprocable jaw will be drawn into gripping relation with the adjacent pedal lever.

8. A brake control mechanism for use in a motor vehicle between the clutch and brake pedal levers, comprising a reciprocably mounted jaw member disposed upon one side of the brake pedal lever for movement relative thereto, a second jaw member mounted upon the opposite side of the brake pedal lever from the reciprocable jaw member, said reciprocable jaw member having a beveled jaw face and being in closer relation to the adjacent lever at its lower edge than at its upper edge, said last jaw member being mounted for oscillation on an axis extending transversely of its line of movement, yieldable means normally urging oscillation of the last jaw member in a direction to project the lower edge of the beveled face into close proximity to the adjacent lever, a pivotally mounted actuating lever having an end arranged for engagement by the clutch pedal when the latter is depressed to a predetermined position, and means operatively coupled with and actuated by said actuating lever when the latter is oscillated by the clutch pedal for shifting the reciprocable jaw member in a direction to grip the brake pedal lever between it and the second-mentioned jaw member.

9. A brake control mechanism for use in a motor vehicle between the clutch and brake pedal levers, comprising an elongated frame body enclosing the brake pedal lever and mounted for rectilinear movement, a jaw member supported in said frame for oscillation on an axis extending transversely of the frame, the jaw member having a beveled gripping face opposing the brake lever, said face having its lower edge in closer proximity to the brake lever than the upper edge, resilient means normally urging the oscillation of the jaw member in a direction to maintain said lower edge in close proximity to the brake pedal lever, a jaw disposed upon the opposite side of the brake pedal lever from the first jaw and mounted to maintain a fixed spaced relation with the brake lever, an actuating lever pivotally supported at one end within said frame adjacent said last jaw and extending upwardly from the frame toward the clutch pedal and having its other end in position for engagement by the clutch pedal when the latter is depressed to a predetermined position whereby the actuating lever will be oscillated downwardly, and a camming coupling means between said actuating lever and said frame whereby upon oscillation of the actuating lever by the clutch pedal, said frame will be shifted to bring the first-mentioned jaw into contact with the adjacent brake pedal lever.

10. A brake control mechanism for use in a motor vehicle between the clutch and brake pedal levers, comprising an elongated frame enclosing the brake pedal lever and mounted for rectilinear movement in a path transversely thereof, a box supported within the frame and extending transversely thereof upon one side of the brake pedal lever, a gripping jaw rockably mounted within said box and having limited movement therein longitudinally of the frame, said jaw upon the side thereof adjacent the brake pedal lever having a gripping face sloping downwardly toward the lever, a resilient body housed within the box between said jaw and a wall of the box and normally rocking the jaw to bring the lower edge of the gripping face in close proximity to the lever, a jaw disposed upon the opposite side of the lever from the first jaw and normally maintaining a fixed spaced relation with the lever, an actuating lever pivotally mounted at one end within the frame and extending upwardly from the frame and terminating at its other end adjacent the clutch pedal to be engaged and oscillated downwardly thereby when the clutch pedal is moved a predetermined distance, spring means normally urging movement of the frame in a direction to shift the first jaw away from the brake pedal lever, and a camming block and roller assembly forming an operative coupling between the actuating lever and the frame to effect the shifting of the frame in a direction opposed to the action of said spring means when the actuating lever is depressed.

11. A brake control mechanism for use in a motor vehicle between the clutch and brake pedal levers, comprising an elongated frame enclosing the brake pedal lever and mounted for rectilinear movement transversely thereof, a friction jaw supported in said frame at one side of said lever, said friction jaw having limited movement longitudinally of the frame, yieldable means normally urging the jaw to move in the frame toward the adjacent lever, an actuating lever pivotally supported upon the opposite side of the brake pedal lever from said jaw, a jaw member upon the opposite side of the brake pedal lever from the first jaw, spring means urging the upward oscillation of the actuating lever, the other end of said actuating lever being in the path of movement of the clutch pedal, spring means secured beneath said actuating lever and engaging said frame to normally urge the latter to shift in a direction to move the first jaw away from the brake pedal lever, and a camming coupling mechanism between the actuating lever and the frame operating upon depression of the actuating lever to shift the frame in a direction opposed to the last-mentioned spring means.

12. A brake control mechanism for use in a motor vehicle between the clutch and brake pedal levers, comprising a yieldable jaw member mounted upon one side of the brake pedal lever and supported for rectilinear movement relative to the lever, an oscillatable lever arm pivotally mounted at one end upon the opposite side of the brake pedal lever from said jaw, means forming an integral part of said arm adjacent the pivoted end providing a jaw having a fixed spaced relation with the brake pedal lever, resilient means normally urging said oscillatable lever to swing upwardly at its other end, the said other end of the oscillatable lever being in the path of movement of and normally spaced from the clutch pedal whereby the oscillatable lever will be depressed when the clutch pedal is depressed to a predetermined point, a camming body disposed transversely of the oscillatable lever and operatively coupled with said first jaw member for rectilinear movement therewith, a second camming body carried by the oscillatable lever and engaging the first camming body whereby upon depression of the oscillatable lever the camming bodies will coact to shift the first jaw into gripping engagement with the brake pedal lever, and resilient means normally urging the first jaw in a direction away from the brake pedal lever.

13. A foot brake lever control for use upon a motor vehicle having a foot brake lever and a clutch lever, comprising two gripping jaws between which the foot brake lever positions, means supporting one jaw for rectilinear movement relative to said brake lever and the other jaw, means supporting the other jaw for movement relative to the adjacent side of the brake lever, means adapted for actuation by and upon operation of the clutch lever for relatively moving the jaws into gripping relation with said brake lever, and supporting means for one of said jaws by which the same has limited oscillation relative to the brake lever.

14. A foot brake lever control for use upon a motor vehicle having a foot brake lever and a clutch lever, comprising two gripping jaws between which the foot brake lever positions, means supporting one jaw for rectilinear movement along a path perpendicular to the path of movement of the brake lever and relative to the brake lever and the other jaw, a vertically oscillatable lever supporting the other jaw adjacent the side of the brake lever opposite from the first jaw and in close proximity to the brake lever, said oscillatable lever being arranged for engagement and oscillation by the clutch lever when the latter is depressed to a predetermined extent, means coupling the oscillatory lever and the said first jaw supporting means whereby the supporting means for the first jaw is given rectilinear movement for relatively moving the jaws into gripping relation with the brake lever, a pivotal support for one of said jaws by which it has rocking movement toward and away from the brake lever, and resilient means normally urging the last-mentioned jaw to rock toward the brake lever.

15. A brake control mechanism for use in a motor vehicle between the clutch and brake pedal levers, consisting of a unit designed to extend transversely with respect to and between said levers and including two gripper members between which the brake pedal lever is disposed, means forming a part of the unit designed to be controlled by the clutch pedal and an operative coupling between said means and one gripper member which is so constructed and arranged that actuation of said clutch pedal to a predetermined extent will effect rectilinear movement of the said one member relative to the other member and the securing of said brake lever therebetween, the said gripping members being normally free of connection with the brake lever.

16. A brake control mechanism for use in a motor vehicle between the clutch and brake pedal levers, consisting of a unit designed to extend transversely with respect to and between said levers and including two gripper members between which the brake pedal lever is disposed, movable means forming a part of the unit adapted to be engaged and moved by the clutch pedal upon depression, and a camming connection between said movable means and one gripper member which is so constructed and arranged that movement of said means by and upon depression of the clutch pedal effects rectilinear movement of the said one member relative to the other member and the securing of said brake lever therebetween, the said gripping members being normally free of connection with the brake lever.

JAMES C. CHALMERS.